United States Patent [19]
Fauth et al.

[11] Patent Number: 5,169,074
[45] Date of Patent: Dec. 8, 1992

[54] REDUCTION IN SIZE OF POLYISOBUTENE

[75] Inventors: Karl-Heinz Fauth, Wattenheim; Franz-Dieter Martischius, Neustadt; Bernhard Raab, Gross-Rohrheim, all of Fed. Rep. of Germany

[73] Assignee: BASF Aktiengesellschaft, Ludwigshafen, Fed. Rep. of Germany

[21] Appl. No.: 757,381

[22] Filed: Sep. 10, 1991

[30] Foreign Application Priority Data

Sep. 12, 1990 [DE] Fed. Rep. of Germany ....... 4028940

[51] Int. Cl.⁵ .............................................. C08J 3/08
[52] U.S. Cl. ...................................... 241/30; 241/23; 528/502
[58] Field of Search .................. 241/23, 30, DIG. 31, 241/DIG. 37; 528/481, 480, 502

[56] References Cited

U.S. PATENT DOCUMENTS

| | | | |
|---|---|---|---|
| 3,771,729 | 11/1973 | Frable | 241/23 X |
| 4,359,193 | 11/1982 | Schönert | 241/30 X |
| 4,510,304 | 4/1985 | Hadermann | 528/481 |
| 4,562,972 | 1/1986 | Hagiwara et al. | 241/260 |

FOREIGN PATENT DOCUMENTS 015151 11/1984 European Pat. Off. .
WO87/03516 6/1987 PCT Int'l Appl. .

*Primary Examiner*—Douglas D. Watts
*Attorney, Agent, or Firm*—Keil & Weinkauf

[57] ABSTRACT

A process for reducing the size of polyisobutene with a molecular weight of from 5,000,000 to 12,000,000 by grinding under pressures of from 1 to 50 bar and with average residence times of from 0.1 to 30 minutes entails the grinding being carried out at from 0° to 60° C.

3 Claims, No Drawings

REDUCTION IN SIZE OF POLYISOBUTENE

The present invention relates to a process for reducing the size of polyisobutene with a molecular weight of from 5,000,000 to 12,000,000 by grinding under pressures of from 1 to 50 bar and with average residence times of from 0.1 to 30 minutes.

The preparation of polyisobutene by cationic polymerization has been described several times (EP-A 206,756, EP-A 265,053, US-A 4,316,973, GB-A 525,542, GB-A 828,367). The polymerization is initiated in these cases using boron halides, especially boron trichloride or trifluoride, and by certain additives, for example by carboxylic acid derivatives, amino compounds, quinolines or formaldehydes (EP-A 195,333, EP-B 115,635). The polymerization of isobutene can be controlled to result in polymers which have molecular weights far above 1,000,000 (Saechtling "Kunststofftaschenbuch", 23rd edition, Carl-Hanser Verlag, Munich/-Vienna, [1986] page 207) and which can be employed, inter alia, as additives to improve the viscosity of mineral oils or as basic material for thin films.

It is necessary for such applications that the polyisobutene is readily soluble in liquid hydrocarbons and mineral oils. However, the polyisobutene particles obtainable after polymerization are normally large and must therefore be reduced in size before they can be dissolved (EP-B 15,151, page 1, lines 11-15). EP-B 15,151, US-A 4,510,304 and PCT Application WO 87/03516 describe processes for reducing the size of polyisobutene in which the polyisobutene is initially dissolved in a liquid and then reduced in size at very low temperatures, ie. at from −70 to −190° C. However, the very low temperatures and the special apparatus necessary for this make this process very technically elaborate. On the other hand, no other way of reducing the size of polymers of isobutene with such high molecular weights was known.

It is an object of the present invention to develop a process for reducing the size of polyisobutene which is less elaborate in terms of processing techniques and apparatus.

We have found that this object is achieved by a process for reducing the size of polyisobutene with a molecular weight of from 5,000,000 to 12,000,000 by grinding under pressures of from 1 to 50 bar and with average residence times of from 0.1 to 30 minutes, which comprises carrying out the grinding at from 0 to 60° C.

The high molecular weight polyisobutene to be reduced in size by the novel process can be obtained, inter alia, by cationic polymerization of isobutene with boron trifluoride as initiator. It has molecular weights (average viscosity) of from 5,000,000 to 12,000,000, preferably from 5,000,000 to 10,000,000, and average particle sizes of from 5 to 20 mm, in particular from 5 to 15 mm. The polyisobutene used for this process can additionally contain the additives conventionally employed in plastics technology, such as stabilizers, fillers, lubricants, nucleating agents or plasticizers.

The grinding is carried out according to the invention at from 0 to 60° C, in particular at from 10 to 50° C. These temperatures are considerably easier to adjust than are those of −70 to −190° C. in the prior art processes, so that the grinding can be carried out in the apparatus conventionally employed for plastics processing. Particularly suitable are mills, drum mixers, extruders, plasticators/processors, roll mills or kneaders, with mills being especially suitable. The grinding is carried out under pressures of from 0.05 to 100 bar, in particular from 0.1 to 50 bar, and with average residence times of from 0.1 to 30 minutes, in particular from 0.1 to 15 minutes.

In a preferred embodiment of the novel process, the final grinding of the polyisobutene is preceded by a preliminary reduction in size with the addition of from 0.5 to 5% by weight, in particular 1 to 4% by weight, of tricalcium phosphate to prevent agglomeration of the smaller particles. In the subsequent final grinding, a further 5 to 30% by weight, in particular 5 to 25% by weight, of tricalcium phosphate is added to the polyisobutene to prevent agglomeration of the polymer particles during the final grinding too. The grinding of the polyisobutene is usually continued until the average particle diameter is less than 1 mm.

The novel process makes it possible to reduce the size of high molecular weight polyisobutene at temperatures which are conventional for grinding in plastics technology so that the use of elaborate cooling and insulating equipment is unnecessary. The resulting polyisobutene has a distinctly reduced particle diameter and thus is readily soluble in mineral oils and liquid hydrocarbons. There is no evident reduction in molecular weight of the polyisobutene which has been reduced in size by the novel process. The novel process is particularly suitable for improving the flow properties of crude oil because it distinctly reduces its resistance to flow.

EXAMPLE 1

12 g of a polyisobutene with an average particle size of 10 mm and an average molecular weight of 6,900,000 were reduced in size in a laboratory mill with a rotating knife and with a diameter of 5 cm and an effective volume of 15 cm$^3$, supplied by Janke und Kunkel/-Labortechnik, at 10 revolutions per second. The molecular weight (average viscosity) was determined by the methods conventional in plastics technology for average viscosity, as are described, for example, in Hans-Georg Elias, Makromoleküle, Verlag Hüthig & Wepf, Basle-Heidelberg-New York, 4th edition (1981) on pages 297-317. The grinding was carried out under a pressure of 0.2 bar, at 40° C. and with an average residence time of the material in the mill of 5 minutes.

The result was 12 g of a polyisobutene in the form of free-flowing granules with an average molecular weight (average viscosity) of 5,900,000 and the following particle size distribution:

Particle distribution in % by weight

| <0.1 mm | <0.2 mm | <0.3 mm |
| --- | --- | --- |
| 18% | 51% | 31% |

EXAMPLE 2

In a preliminary size-reduction step, 1.6 tonnes of a polyisobutene with an average molecular weight (average viscosity) of 6,900,000 and an average particle diameter of 10 mm were reduced to an average particle size of 2 to 6 mm in a mill supplied by Pallmann (PS 4-5) with a throughput of 400 kg/h at 11 revolutions per second, under a pressure of 0.25 bar, at 30° C. and with an average residence time of 7.5 minutes. To prevent agglomeration of the small particles, 2% by weight tricalcium phosphate had previously been added to the polyisobutene.

The polyisobutene obtained from this step was then subjected to the final grinding in another mill supplied by Pallmann (PKM 600) with a throughput of 250 kg/h, at 58 revolutions per second, under a pressure of 0.63 bar, at 40° C. and with an average residence time of 4.8 minutes. Once again, agglomeration of the polymer particles was prevented by adding 4% by weight tricalcium phosphate before the milling and a further 15% by weight tricalcium phosphate to the discharge from the mill.

The result was 1.9 tonnes of a free-flowing polyisobutene with an average molecular weight (average viscosity) of 5,900,000 and the following particle size distribution:

Particle size distribution in % by weight

| <0.2 mm | <0.3 mm | <0.5 mm | <0.8 mm | <1.0 mm | <1.5 mm |
| --- | --- | --- | --- | --- | --- |
| 7% | 4% | 18% | 37% | 19% | 15% |

EXAMPLE 3

The reduction in resistance brought about by the polyisobutene obtained from Examples 1 and 2 was determined by continuous pressure/throughput measurement in a tube with a length of 1 m and a diameter of 3 mm with turbulent flow (Reynold's number Re=20,000). The material flowing in the tube was petroleum. The polyisobutene was added to the petroleum before it entered the tube. The results of this are to be found in the Table which follows.

TABLE

| Concentration of polyisobutene in the petroleum [in ppm] | Reduction in the resistance to flow [in %] |
| --- | --- |
| 3 | 15 |
| 5 | 26 |
| 10 | 33 |

We claim:
1. A process for reducing the size of polyisobutene with a molecular weight of from 5,000,000 to 12,000,000 by grinding under pressures of from 0.1 to 100 bar and with average residence times of from 0.1 to 30 minutes, which comprises carrying out the grinding at from 0 to 60° C.

2. A process as claimed in claim 1, wherein the grinding is carried out at from 10 to 50° C.

3. A process as claimed in claim 1, which is used to reduce the size of polyisobutene with a molecular weight of from 5,000,000 to 10,000,000.

* * * * *